US006679114B2

(12) United States Patent
Yamakawa

(10) Patent No.: US 6,679,114 B2
(45) Date of Patent: Jan. 20, 2004

(54) THERMOSENSITIVE FLOW RATE SENSOR

(75) Inventor: Tomoya Yamakawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/121,713

(22) Filed: Apr. 15, 2002

(65) Prior Publication Data
US 2002/0174718 A1 Nov. 28, 2002

(30) Foreign Application Priority Data
May 24, 2001 (JP) ........................................ 2001-155299

(51) Int. Cl.⁷ .................................................. G01F 1/68
(52) U.S. Cl. .................................................. 73/204.26
(58) Field of Search ........................ 73/204.26, 204.25, 73/204.22, 204.23, 202.5, 204.11

(56) References Cited

U.S. PATENT DOCUMENTS 6,253,606 B1 * 7/2001 Yonezawa et al. ........ 73/204.26
6,393,907 B1 * 5/2002 Yamakawa et al. ...... 73/204.26

FOREIGN PATENT DOCUMENTS

| JP | 10-002773 | 6/1998 |
| JP | 11-326000 | 11/1999 |
| JP | 2000-131112 | 12/2000 |

* cited by examiner

Primary Examiner—Edward Lefkowitz
Assistant Examiner—Corey D. Mack
(74) Attorney, Agent, or Firm—Sughrue Mion, PLLC

(57) ABSTRACT

A thermosensitive flow rate sensor includes a detecting element, in which a heating element and a fluid temperature detector are formed so as to be separated from each other on a surface of a flat substrate and a flow rate detection diaphragm is formed under a region where the heating element is formed, and a support having a recess portion, the detecting element being housed inside the recess portion such that a surface of the detecting element is positioned generally in a common plane with a surface of the support and such that a direction of alignment of the heating element and the fluid temperature detector is perpendicular to a direction of flow of a fluid being measured, and a groove being formed in the support so as to pass under a region where the fluid temperature detector is formed in the direction of flow of the fluid being measured.

13 Claims, 10 Drawing Sheets

THERMOSENSITIVE FLOW RATE SENSOR

This application is based on Application No. 2001-155299, filed in Japan on May 24, 2001, the contents of which are hereby incorporated by reference.

BACKGROUND OF THE INVENTION

1. Field of the Invention

The present invention relates to a thermosensitive flow rate sensor including a heating element, the thermosensitive flow rate sensor measuring the flow velocity or flow rate of a fluid based on a heat transfer phenomenon where a heat is transferred to the fluid from the heating element or a portion heated by the heating element, the thermosensitive flow rate sensor being used to measure an intake air flow rate in an internal combustion engine, for example.

2. Description of the Related Art

FIG. 9 is a plan showing a detecting element used in a conventional thermosensitive flow rate sensor, and FIG. 10 is a cross section taken along line X—X in FIG. 9 viewed from the direction of the arrows.

In FIGS. 9 and 10, a flat substrate 1 is constituted by a silicon substrate having a thickness of approximately 0.4 mm. An electrically-insulating support film 2 made of silicon nitride, etc., having a thickness of 1 μm is formed on a surface of the substrate 1 by performing a method such as sputtering, chemical vapor deposition (CVD), etc. A heating element 4 constituted by a thermosensitive resistor film of platinum, etc., is formed on the support film 2. The heating element 4 is constructed so as to be formed with electric current paths by depositing a thermosensitive resistor film of platinum, etc., having a thickness of 0.2 μm on the support film 2 by performing a method such as vapor deposition or sputtering, etc., and patterning the thermosensitive resistor film by using a method such as photolithography, or wet or dry etching, etc. A fluid temperature detector 5 similarly composed of a thermosensitive resistor film of platinum, etc., is formed on the support film 2 away from the heating element 4. The fluid temperature detector 5 is constructed so as to be formed with electric current paths by depositing a thermosensitive resistor film of platinum, etc., having a thickness of 0.2 μm on the support film 2 by performing a method such as vapor deposition or sputtering, etc., and patterning the thermosensitive resistor film by using a method such as photoengraving, or wet or dry etching, etc. In addition, an electrically-insulating protective film 3 made of silicon nitride, etc., having a thickness of 1 μm is formed by performing a method such as sputtering, CVD, etc., on the heating element 4 and the fluid temperature detector 5.

The heating element 4 is connected through first and second connection patterns 9a and 9b and first and fourth lead patterns 7a and 7d to first and fourth electrodes 8a and 8d for electrically connecting a detecting element to an external circuit. The fluid temperature detector 5 is connected through second and third lead patterns 7b and 7c to second and third electrodes 8b and 8c for electrically connecting the detecting element to an external circuit. The protective film 3 is removed from portions of the first to fourth electrodes 8a to 8d so as to be connected to an external circuit by a method such as wire bonding.

In addition, a flow rate detection diaphragm 12 is constructed by forming a cavity 13 under a region where the heating element 4 is formed. More specifically, a rear-surface protective film 10 is formed on a rear surface of the flat substrate 1 (a surface on the opposite side from the surface on which the support film 2 is formed), and then an etched hole 11 is formed by partially removing the rear-surface protective film 10 by a method such as photolithography at a position on the rear side of the region where the heating element 4 is formed. Thereafter, the flow rate detection diaphragm 12 is constructed by applying alkali etching, for example, to the flat substrate 1 exposed through the etched hole 11 to remove part of the flat substrate 1 and form the cavity 13.

The detecting element 14 constructed in this manner is disposed such that the flow rate detection diaphragm 12 is exposed to the flow of the fluid being measured. Moreover, in each of the figures, an arrow 6 indicates the direction of flow of the fluid being measured.

The detecting element 14 has a flat shape, as described above, and when the diaphragm 12 is disposed so as to be perpendicular to the direction of flow of the fluid being measured, fluid pressure acts on the diaphragm 12, giving rise to damage to the diaphragm 12 when the fluid being measured is flowing at high velocity, and dust in the fluid being measured may also accumulate on the diaphragm portion, changing the rate of heat transfer from the heating element 4 to the fluid being measured, thereby giving rise to drifts in the detected flow rate. In such cases, the flat detecting element 14 is disposed generally parallel to the direction of flow of the fluid being measured or so as to be inclined at a predetermined angle relative to the direction of flow of the fluid being measured.

When the flat detecting element 14 is disposed generally parallel to the direction of flow of the fluid being measured or so as to be inclined at a predetermined angle relative to the direction of flow of the fluid being measured, disturbances may arise in the flow of the fluid being measured in the vicinity of the cavity 13, or irregularities may arise in the flow of the fluid being measured in the vicinity of the heating element 4 due to irregularities in the shape of a leading edge portion of the detecting element 14 resulting from chipping, etc. These irregularities in the flow of the fluid being measured in the vicinity of the heating element 4 lead to decreased precision in flow rate detection.

Thus, in order to solve the problems described above in cases where the flat detecting element 14 is disposed generally parallel to the direction of flow of the fluid being measured or so as to be inclined at a predetermined angle relative to the direction of flow of the fluid being measured, it has been proposed in Japanese Patent Non-Examined Laid-Open No. 11-326000, for example, that the detecting element be disposed inside a recess portion formed on a flat support.

FIG. 11 is a partial perspective showing a support construction of the conventional detecting element described in Japanese Patent Non-Examined Laid-Open No. 11-326000.

In FIG. 11, a support 16 is formed into a flat shape, and is mounted to a base member 20. A recess portion 18 having a slightly larger external shape than the detecting element 14 is formed on a surface of the support 16. The detecting element 14 is disposed inside the recess portion 18 such that a surface of the detecting element 14 is positioned generally in a common plane with a surface of the support 16. The first to fourth electrodes 8a to 8d of the detecting element 14 are electrically connected by wires 19 to lead wires 17 disposed in the base member 20. A cover 21 is mounted to the base member 20, and the first to fourth electrodes 8a to 8d and the wires 19 are protected by the cover 21.

Hence, disturbances in the flow of the fluid being measured arising in the vicinity of the cavity 13 are suppressed, and the flow of the fluid being measured is smoothed by the arc shape of an upstream end portion of the support 16, reducing irregularities in the flow of the fluid being measured in the vicinity of the heating element 4 that are generated by irregularities in the shape of the leading edge portion of the detecting element 14.

Next, a method for detecting the flow rate of a fluid being measured using the detecting element 14 will be explained.

Because the fluid temperature detector 5 is separated from the diaphragm portion 12, heat generated by the heating element 4 is not transferred to the fluid temperature detector 5. Because the fluid temperature detector 5 is not positioned downstream from the heating element 4, the fluid temperature detector 5 is not exposed to the fluid being measured that has been warmed by heat transfer from the heating element 4. Thus, the temperature detected by the fluid temperature detector 5 is substantially equal to the temperature of the fluid being measured.

The heating element 4 is controlled by a detector circuit shown in FIG. 12 so as to be at a resistance value such that the average temperature of the heating element 4 is higher by a predetermined temperature (100 degrees Celsius, for example) than the temperature of the fluid being measured detected by the fluid temperature detector 5. The detector circuit is constituted by a bridge circuit including the fluid temperature detector 5 and the heating element 4. In FIG. 12, first to fifth resistors R1, R2, R3, R4, and R5 are fixed resistors, OP1 and OP2 are operational amplifiers, TR1 and TR2 are transistors, and BATT is an electric power supply. Except for the fluid temperature detector 5 and the heating element 4, the detector circuit is constituted by a detector circuit substrate (not shown).

The detector circuit controls the excitation current Ih flowing to the heating element 4 by functioning so as to generally equalize electric potentials at Point a and Point b in the figure. If the flow velocity of the fluid being measured is high, the temperature of the heating element 4 drops since the rate of heat transfer from the heating element 4 to the fluid being measured increases. Thus, the excitation current Ih required to keep the average temperature of the heating element 4 at the value higher by the predetermined temperature than the temperature of the fluid being measured increases. By detecting the excitation current as a voltage Vout at first and second ends of the third resistor R3, a flow velocity signal or a flow rate signal for the fluid being measured flowing through the inside of a passage having a predetermined passage cross-sectional area can be obtained.

Now, if Th is the temperature of the heating element 4, Ta is the temperature of the fluid being measured, Rh is the resistance value of the heating element 4, Ih is the excitation current flowing to the heating element 4, and Qm is the flow rate of the fluid being measured flowing through the passage in which the detecting element 14 is disposed, then Expression (1) is satisfied:

$$Ih^2 \cdot Rh = (a + b \cdot Qm^n) \cdot (Th - Ta) \quad (1)$$

where a, b, and n are constants determined by the form and layout of the detecting element.

Thus, by making (Th−Ta)/Rh uniform regardless of Ta, Ih becomes a function of Qm and the output corresponding to Ih becomes the detected flow rate output of the thermosensitive flow rate sensor.

The support construction of the conventional detecting element shown in FIG. 11 has the problems described below.

When the temperature of the fluid being measured changes, errors arise in the flow rate value detected by the thermosensitive flow rate sensor unless the temperature of the heating element 4 is adjusted in response to the temperature changes in the fluid being measured so that the temperature detected by the fluid temperature detector 5 swiftly tracks the actual temperature of the fluid being measured. For example, when the temperature of the fluid being measured rises, if a time lag occurs before the detection of the temperature by the fluid temperature detector 5, the temperature detected by the fluid temperature detector 5 will be lower than the actual temperature of the fluid being measured, making the temperature of the heating element 4 lower than the normal predetermined control temperature. In other words, the excitation current flowing to the heating element 4 falls below the normal electric current control value. Thus, the flow rate value detected on the basis of the excitation current flowing to the heating element 4 registers as a lower value than the actual flow rate of the fluid being measured.

However, because the temperature detected by the fluid temperature detector 5 cannot immediately track the actual temperature of the fluid being measured due to the heat capacity of the support 16, errors in the flow rate value detected by the thermosensitive flow rate sensor cannot be suppressed in this support construction.

Thus, in order to suppress the influence of the heat capacity of the support 16 on the temperature detection tracking of the fluid temperature detector 5, a support construction for a detecting element has been proposed in Japanese Patent Non-Examined Laid-Open No. 10-2773, for example, in which the detecting element is supported by a support such that a first end of the detecting element formed with a fluid temperature detector extends outward from the support. However, in the support construction of this detecting element, the flow of the fluid being measured is disturbed by a tip portion of the support and a tip portion of the detecting element because the support terminates in the vicinity of the heating element. The heating element is subjected to the influence of these disturbances in the flow of the fluid being measured, giving rise to problems such as the detected flow rate value becoming erratic.

In a thermosensitive flow rate sensor for measuring an intake air flow rate of an automotive internal combustion engine in particular, there are cases in which intake air temperature changes suddenly at the entrance or exit of a tunnel, making it necessary to be able to track these changes in intake air temperature swiftly.

The thermosensitive flow rate sensor for measuring the intake air flow rate of the automotive internal combustion engine is disposed in the piping which links a throttle valve and an air cleaner case. In general, since piping of this kind is not an ideal straight pipe upstream and downstream from the thermosensitive flow rate sensor, flow velocity distribution and the direction of flow are nonuniform. In applications of this kind for measuring the intake air flow rate of the automotive internal combustion engine, stable flow measurement becomes difficult with detecting element support constructions in which flow separation and vortexing of the fluid being measured occur easily in the vicinity of the heating element (or flow rate detector portion).

SUMMARY OF THE INVENTION

The present invention aims to solve the above problems and an object of the present invention is to provide a thermosensitive flow rate sensor enabling flow rate to be measured accurately without adversely affecting a detected flow rate signal even if the temperature of the fluid being measured changes, by directing the fluid being measured under a region where a fluid temperature detector is formed to swiftly acclimatize the region where the fluid temperature detector is formed to the temperature of the fluid being measured by forced convective heat transfer.

In order to achieve the above object, according to one aspect of the present invention, there is provided a thermosensitive flow rate sensor including:

a detecting element having:
a flat substrate;
a heating element and a fluid temperature detector each made of a thermosensitive resistor film and formed so as to be separated from each other on a surface of the flat substrate; and
a flow rate detection diaphragm formed by partially removing the flat substrate from a rear surface side under a region where the heating element is formed; and a support having a recess portion for housing the detecting element formed on a surface thereof, the support being disposed such that the surface is inclined at a predetermined angle relative to a direction of flow of a fluid being measured, wherein the detecting element is housed inside the recess portion and supported by the support such that a surface of the detecting element is positioned generally in a common plane with the surface of the support and such that a direction of alignment of the heating element and the fluid temperature detector is perpendicular to the direction of flow of the fluid being measured, and a groove having a groove direction lying in the direction of flow of the fluid being measured is formed in the support so as to pass under a region where the fluid temperature detector of the detecting element is formed.

The fluid temperature detector may be formed at a first end side of the flat substrate, the detecting element being supported in a cantilever configuration by the support such that a first end portion of the detecting element including the region where the fluid temperature detector is formed extends into the groove.

The groove may extend to an upstream end portion of the support in the direction of flow of the fluid being measured.

The groove may extend to a downstream end portion of the support in the direction of flow of the fluid being measured.

A fluid temperature detection diaphragm may be formed by partially removing the flat substrate from a rear surface side under a region where the fluid temperature detector is formed.

A pipe-shaped detector passage may be provided for the fluid being measured to flow through, the support being disposed inside the detector passage so as to divide into two sections a passage cross section of the detector passage perpendicular to the direction of flow of the fluid being measured.

DETAILED DESCRIPTION OF THE PREFERRED EMBODIMENTS

Embodiment 1

Figure 1:
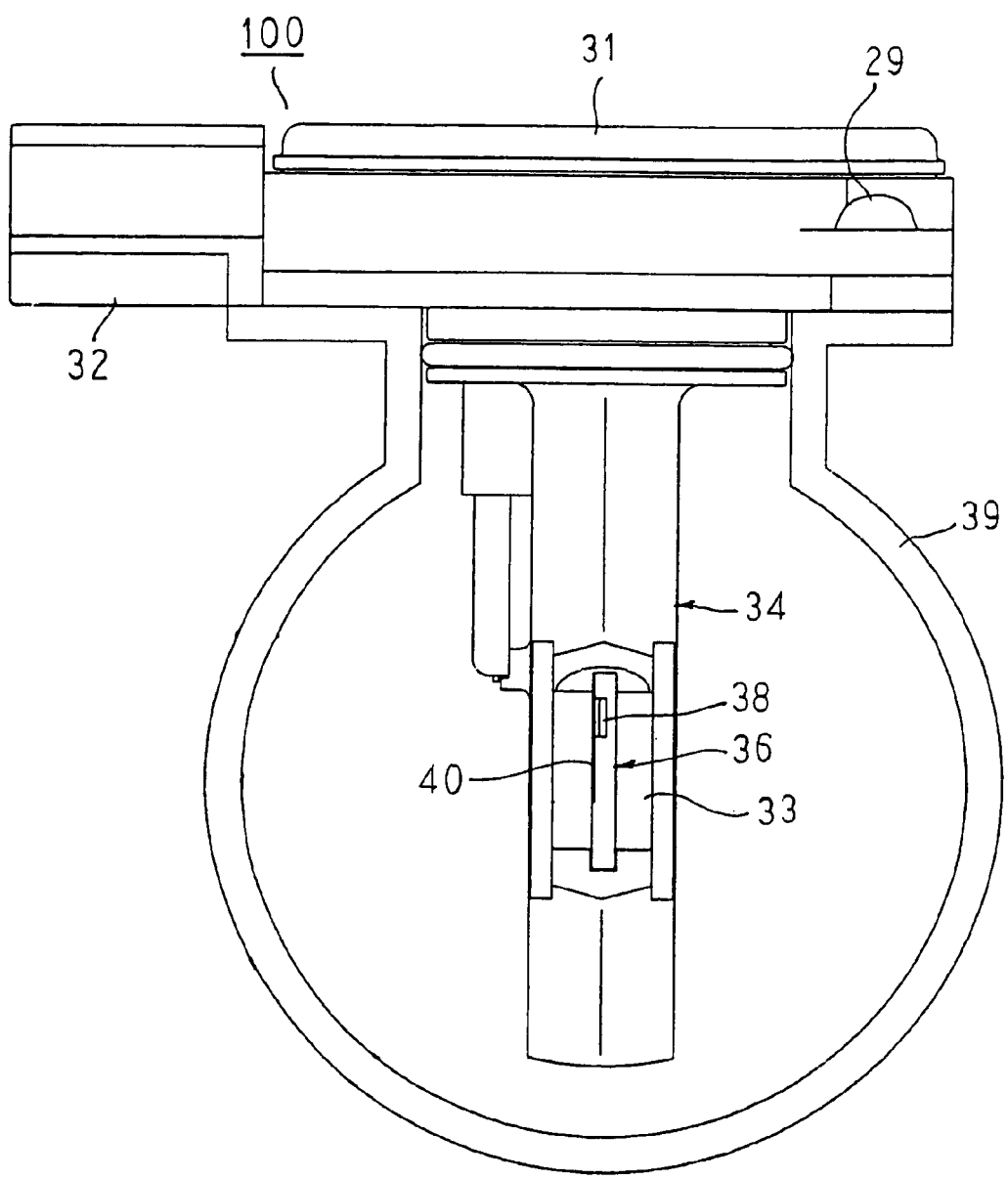
FIG. 1 is a front elevation showing a thermosensitive flow rate sensor according to Embodiment 1 of the present invention.
Figure 2:
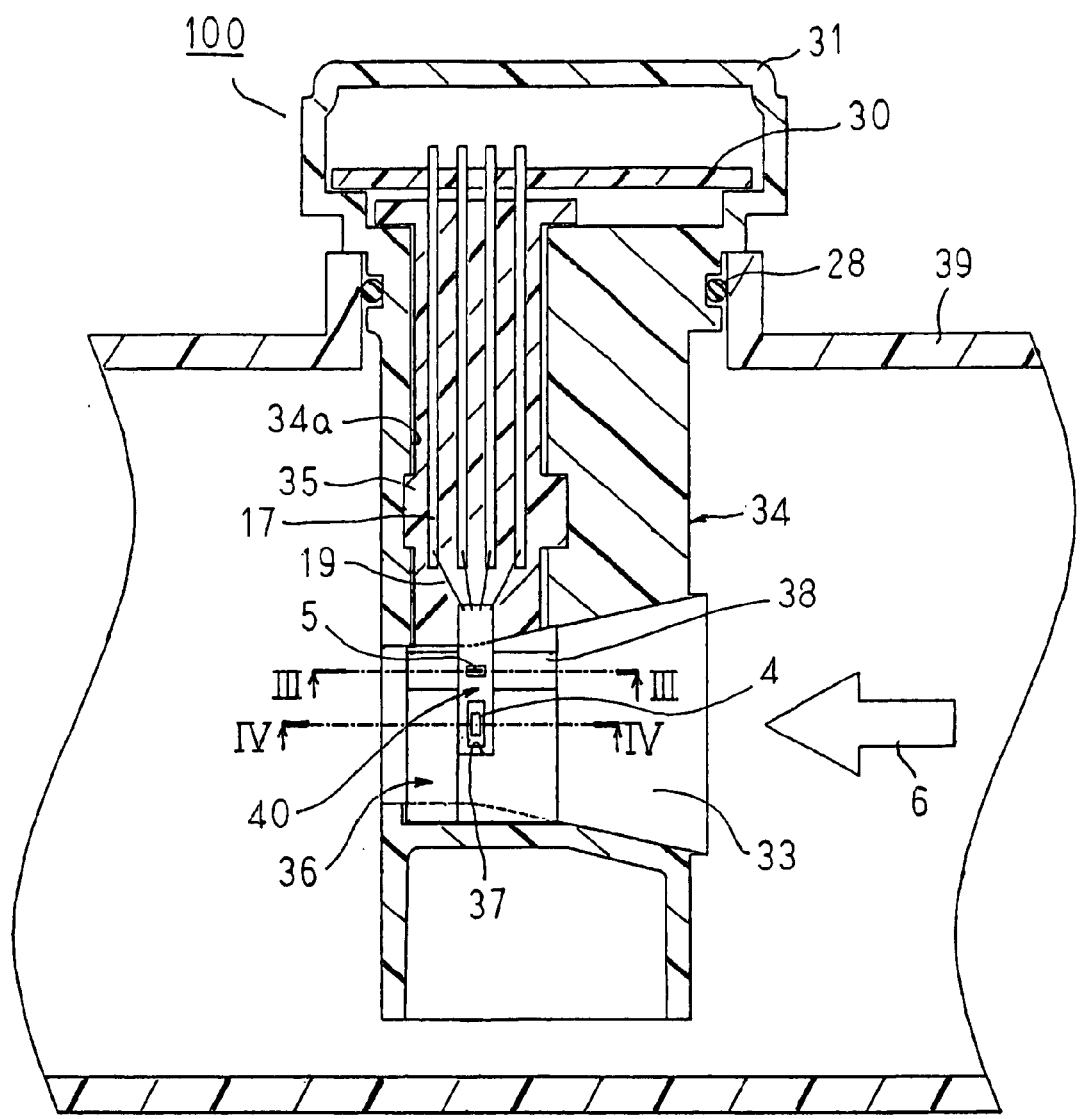
FIG. 2 is a longitudinal section showing the thermosensitive flow rate sensor according to Embodiment 1 of the present invention.
Figure 3:
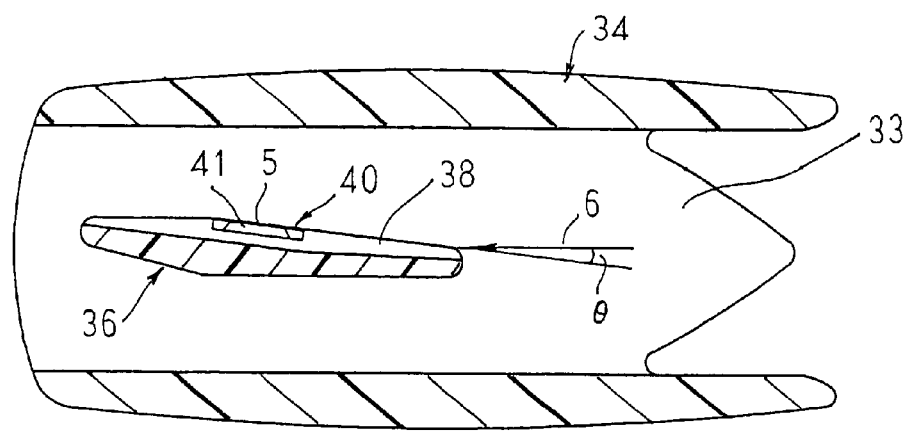
FIG. 3 is a cross section taken along line III—III in FIG. 2 viewed from the direction of the arrows.
Figure 4:
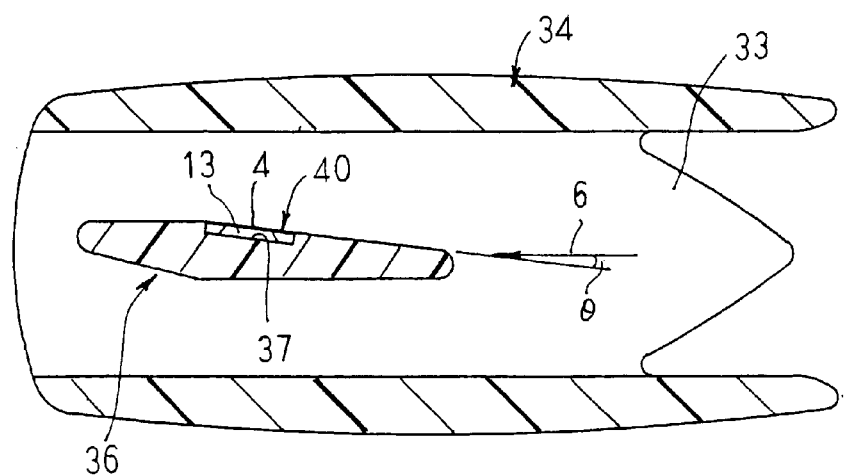
FIG. 4 is a cross section taken along line IV—IV in FIG. 2 viewed from the direction of the arrows.
Figure 5:
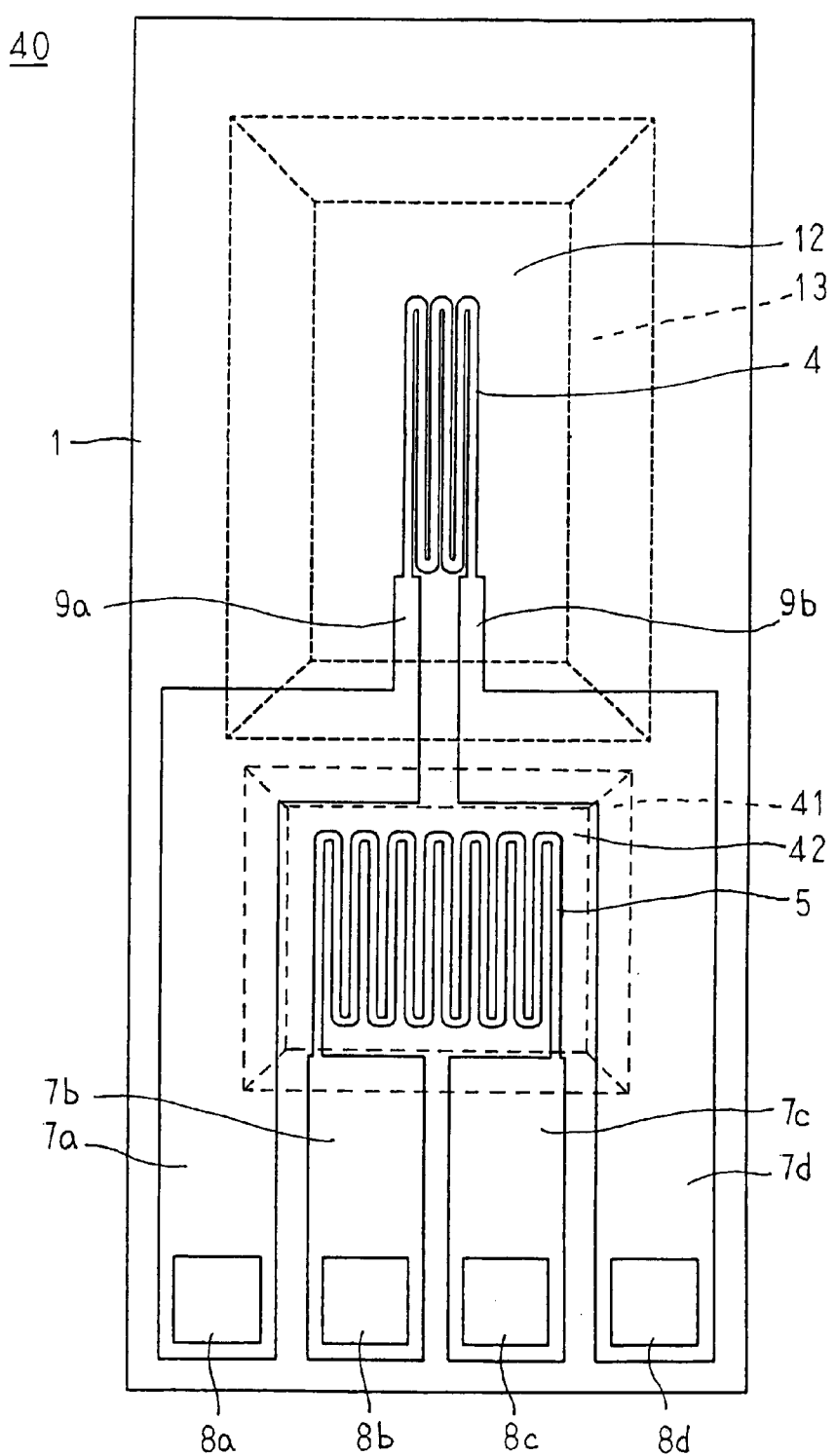
FIG. 5 is a plan showing a detecting element used in the thermosensitive flow rate sensor according to Embodiment 1 of the present invention.
Figure 9:
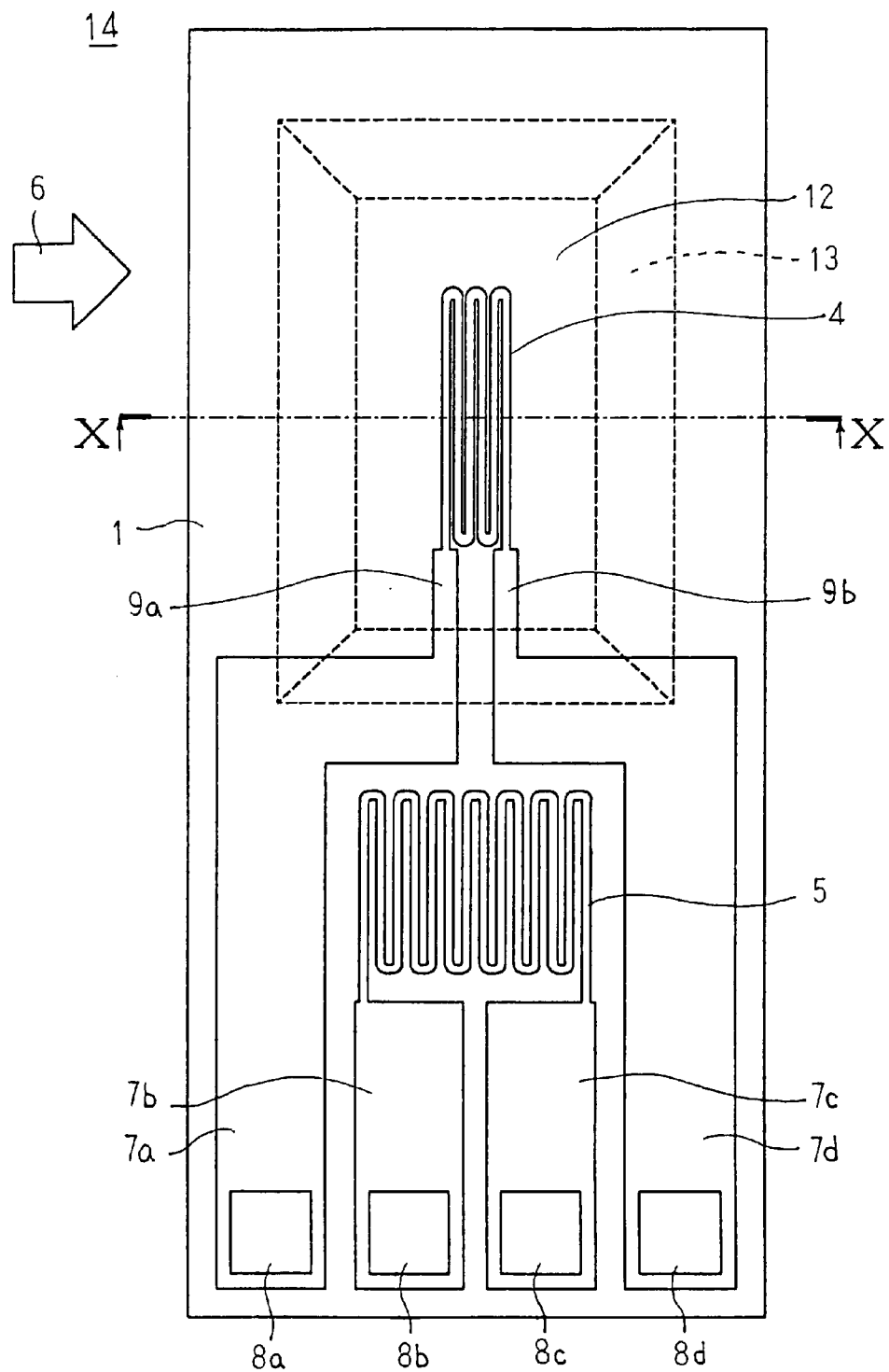
FIG. 9 is a plan showing a detecting element used in a conventional thermosensitive flow rate sensor.
Figure 10:
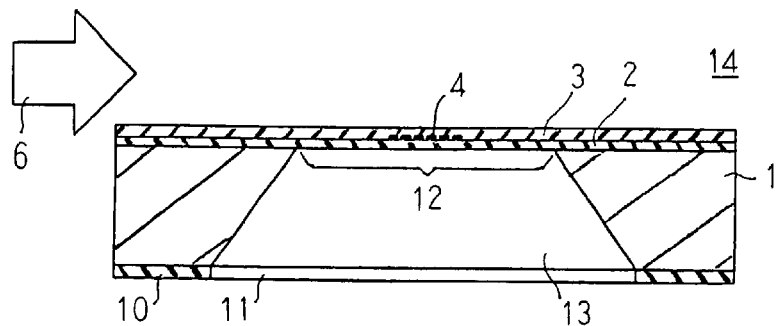
FIG. 10 is a cross section taken along line X—X in FIG. 9 viewed from the direction of the arrows.
Figure 11:
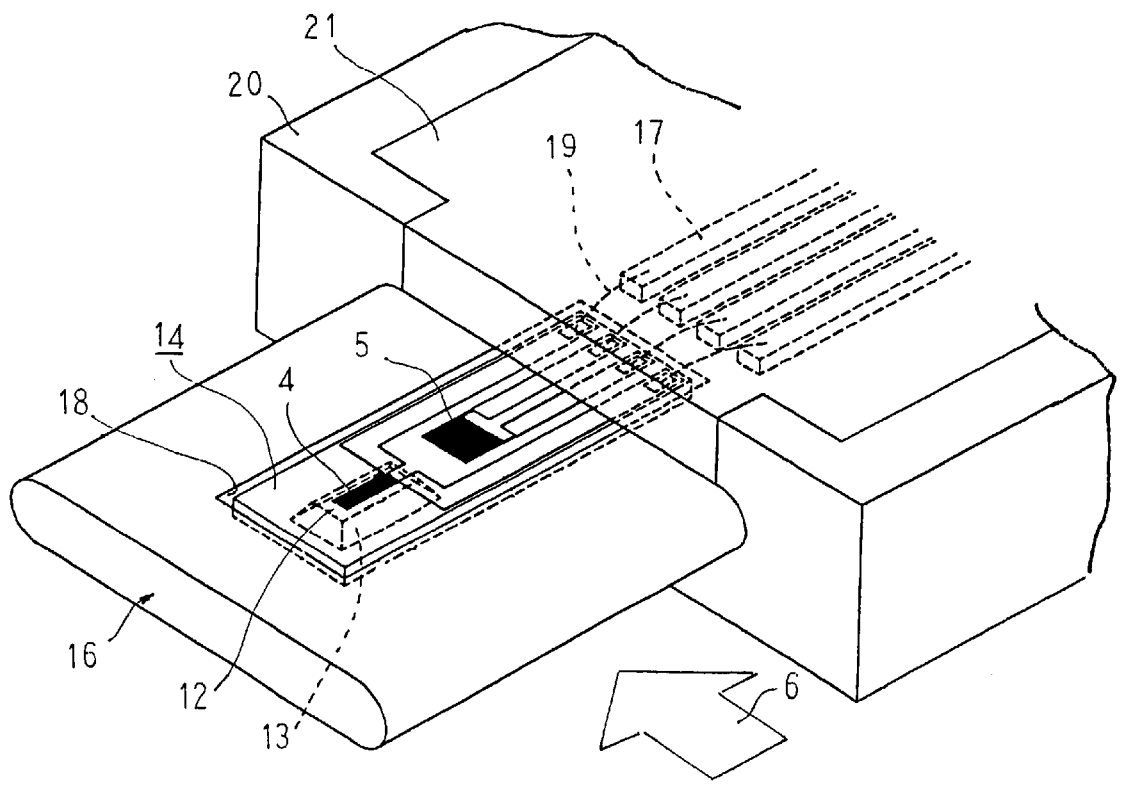
FIG. 11 is a partial perspective showing a support construction of the conventional detecting element.

FIGS. 1 and 2 are a front elevation and a longitudinal section, respectively, showing a thermosensitive flow rate sensor according to Embodiment 1 of the present invention. FIG. 3 is a cross section taken along line III—III in FIG. 2 viewed from the direction of the arrows, FIG. 4 is a cross section taken along line IV—IV in FIG. 2 viewed from the direction of the arrows, and FIG. 5 is a plan showing a detecting element used in the thermosensitive flow rate sensor according to Embodiment 1 of the present invention. Moreover, in each of the figures, portions the same as or corresponding to those in the conventional devices shown in FIGS. 9 to 11 will be given the same numbering, and explanation thereof will be omitted.

Figure 12:
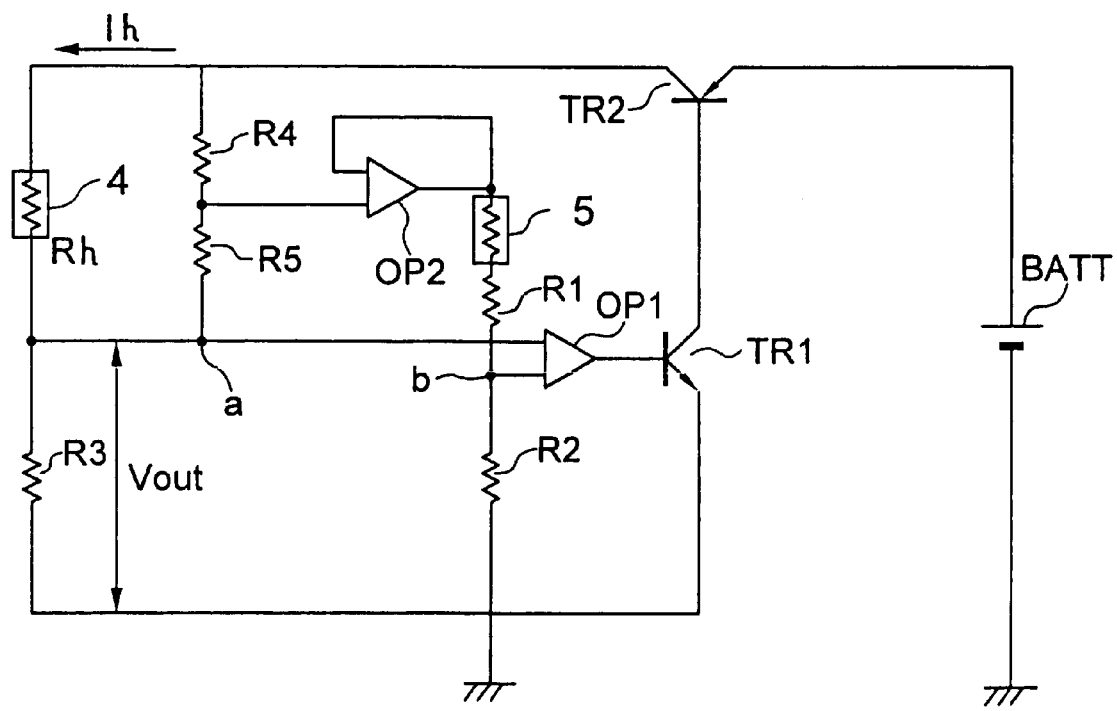
FIG. 12 is a diagram showing a control circuit of the detecting element used in the conventional thermosensitive flow rate sensor.

In FIGS. 1 to 4, a thermosensitive flow rate sensor 100 is constituted by: a circuit substrate 30 on which the detector circuit shown in FIG. 12 is constructed; a circuit case 31 for housing the circuit substrate 30; a connector 32 for supplying electric power to the thermosensitive flow rate sensor 100 and extracting a detected flow rate signal from the thermosensitive flow rate sensor 100; an insertion member 34 disposed so as to extend to a first side from the circuit case 31, a detector passage 33 through which a fluid being measured flows being formed in the insertion member 34; a base member 35 formed with lead wires 17 disposed inside the insertion member 34; a support 36 mounted to the base member 35 so as to extend into the detector passage 33; and a detecting element 40 mounted to the support 36.

The circuit case 31, the connector 32, and the insertion member 34 are formed integrally using a resin such as polybutylene terephthalate, for example. A groove 34a for housing the base member 35 is formed in the insertion member 34 so as to communicate between the detector passage 33 and the circuit case 31.

The support 36 is formed into a flat shape from a resin such as polybutylene terephthalate, and is mounted to the base member 35 so as to extend into the detector passage 33. The support 36 is disposed so as to pass through a central axis of the detector passage 33 (in a direction perpendicular to the surface of the page in FIG. 1 and aligned with the direction of flow 6 of the fluid being measured) and to divide a passage cross section of the detector passage 33 perpendicular to the central axis into two sections. A major surface of the support 36 is inclined at an angle θ to the central axis of the detector passage 33, as shown in FIGS. 3 and 4. In Embodiment 1, the angle θ is seven degrees. A recess portion 37 having a slightly larger external shape than the detecting element 40 is disposed in the major surface of the support 36 so as to extend from a root end (the end mounted to the base member 35) to a tip end. In addition, a groove 38 passing on the rear surface side of the fluid temperature detector 5 of the detecting element 40 parallel to the central axis of the detector passage 33 is disposed on the major surface at the root end of the support 36 so as to extend from an upstream end portion of the support 36 to a downstream end portion.

As shown in FIG. 5, a fluid temperature detection diaphragm 42 is constructed by forming a cavity 41 under a region of the detecting element 40 where the fluid temperature detector 5 is formed. Moreover, this detecting element 40 is constructed in a similar manner to the conventional detecting element 14 except for the fact that the fluid temperature detection diaphragm 42 is formed.

The detecting element 40 is disposed inside the recess portion 37 such that a surface of the detecting element 40 is positioned generally in a common plane with the major surface of the support 36. Here, the groove 38 is positioned under the fluid temperature detection diaphragm 42. First to fourth electrodes 8a to 8d of the detecting element 40 are electrically connected by wires 19 to the lead wires 17 disposed in the base member 35, and a cover (not shown) is mounted to the insertion member 34, the first to fourth electrodes 8a to 8d and the wires 19 being protected by the cover. The detector circuit shown in FIG. 12 is constructed by connecting the lead wires 17 to the circuit substrate 30.

The thermosensitive flow rate sensor 100 constructed in this manner is mounted by inserting the insertion member 34 inside a cylindrical major passage 39 forming the passage for the fluid being measured such that the central axis of the detector passage 33 aligns with the central axis of the major passage 39, and securely fastening the thermosensitive flow rate sensor 100 to the major passage 39 by a screw 29. The surface of the detecting element 40 supported in the support 36 is inclined at the predetermined angle θ to the direction of flow 6 of the fluid being measured. An θ ring 28 is interposed between the thermosensitive flow rate sensor 100 and the major passage 39, preventing leakage of the fluid being measured.

In this thermosensitive flow rate sensor 100, the fluid being measured flowing through the inside of the major passage 39 is directed inside the detector passage 33. The fluid being measured flowing in the vicinity of the central axis in the detector passage 33 flows along the major surface of the support 36, is led over the heating element 4, is warmed there by the transfer of heat generated in the heating element 4, and flows downstream. The fluid being measured flowing on an upper side in the detector passage 33 in FIG. 1, flows along an upper portion side of the fluid temperature detector 5, and also is led inside the groove 38 and flows along a lower side of the fluid temperature detector 5.

As explained earlier, the excitation current flowing to the heating element 4 is controlled by the detector circuit such that the average temperature of the heating element 4 is higher by a predetermined temperature (100 degrees Celsius, for example) than the temperature of the fluid being measured detected by the fluid temperature detector 5. This excitation current is extracted as a detected flow rate signal, enabling a flow velocity or a flow rate for the fluid being measured flowing through the inside of a passage having a predetermined passage cross-sectional area to be detected.

According to Embodiment 1, because the groove 38 is formed in the support 36 so as to pass along the lower side of the fluid temperature detector 5, the fluid being measured flows along the front surface side and the rear surface side of the region of the detecting element 40 where the fluid temperature detector 5 is formed. The region where the fluid temperature detector 5 is formed is swiftly acclimatized to the temperature of the fluid being measured by forced convective heat transfer with the fluid being measured that is directed through the groove 38 to the rear surface side of the region where the fluid temperature detector 5 is formed. Because the region of the detecting element 40 where the fluid temperature detector 5 is formed is separated from the support 36, the influence of the heat capacity of the support 36 is reduced. Thus, the temperature detected by the fluid temperature detector 5 swiftly tracks the temperature changes of the fluid being measured, and the temperature of the heating element 4 can be controlled at the value higher by the predetermined temperature than the temperature of the fluid being measured even if the temperature of the fluid being measured changes. Hence, a thermosensitive flow rate sensor is provided in which the flow velocity and the flow rate of the fluid being measured can be accurately detected.

Because the region where the fluid temperature detector 5 is formed constitutes the fluid temperature detection diaphragm 42, the heat capacity of the region where the fluid temperature detector 5 is formed is reduced, and the fluid temperature detector 5 is thermally insulated from the neighboring flat substrate 1. Hence, the temperature of the fluid being measured is detected swiftly and accurately by the fluid temperature detector 5.

Because the groove 38 is formed in the support 36 so as to extend from an upstream end to a downstream end, the fluid being measured is directed smoothly inside the groove 38 from the upstream end of the support 36 and flows out smoothly from the groove 38 at the downstream end of the support 36. Thus, because the fluid being measured can be supplied to the rear surface side of the fluid temperature detector 5 without interruption and in large quantity, the actual temperature of the fluid being measured can be detected swiftly by the fluid temperature detector 5 even if the temperature of the fluid being measured changes.

Now, disturbances arise in the flow of the fluid being measured due to the fluid being measured being divided and flowing onto the front surface side and the rear surface side of the region of the detecting element 40 where the fluid temperature detector 5 is formed. However, since the only function of the fluid temperature detector 5 is to detect the temperature of the fluid being measured, these disturbances to the flow of the fluid being measured do not affect temperature detection by the fluid temperature detector 5. On the other hand, because the region of the detecting element 40 where the heating element 4 is formed is separated in a direction perpendicular to the direction of flow 6 of the fluid being measured from the region where the fluid temperature detector 5 is formed, the flow of the fluid being measured flowing in the vicinity of the heating element 4 is not subjected to the influence of the disturbances in the flow of the fluid being measured resulting from forming the groove 38 and is stable. Consequently, disturbances do not occur in the detected flow rate signal even if the groove 38 is formed, thus providing a stable detected flow rate signal.

Because the support 36 is disposed so as to divide the passage cross section of the detector passage 33 into two sections, the detector passage 33 is formed into symmetrical shapes about the central axis of the detector passage 33 relative to a top and bottom direction in FIG. 1. Thus, the flow velocity distribution is made uniform even if there are drift currents in the flow of the fluid being measured, improving the precision of the flow rate detection.

Because the tip surface of the support 36 (the lower end surface in FIG. 1) is not exposed inside the detector passage 33, the fluid being measured is directed to the heating element 5 without disturbances arising in the flow, providing a stable detected flow rate signal with few disturbances. Moreover, if the tip surface of the support 36 is exposed inside the detector passage 33, the fluid being measured separates at the tip surface of the support 36, giving rise to disturbances in the flow of the fluid being measured.

Embodiment 2

Figure 6:
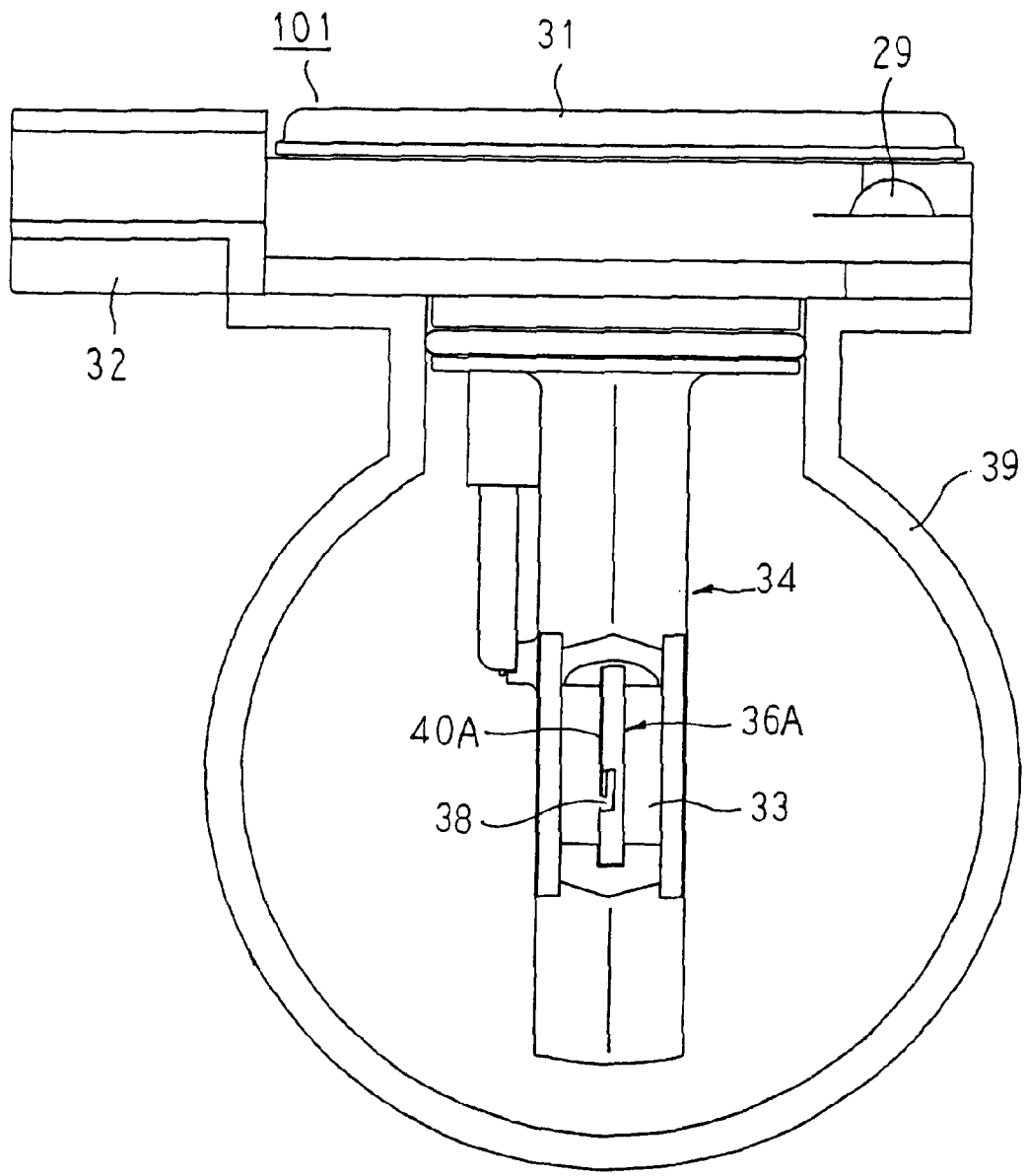
FIG. 6 is a front elevation showing a thermosensitive flow rate sensor according to Embodiment 2 of the present invention.
Figure 7:
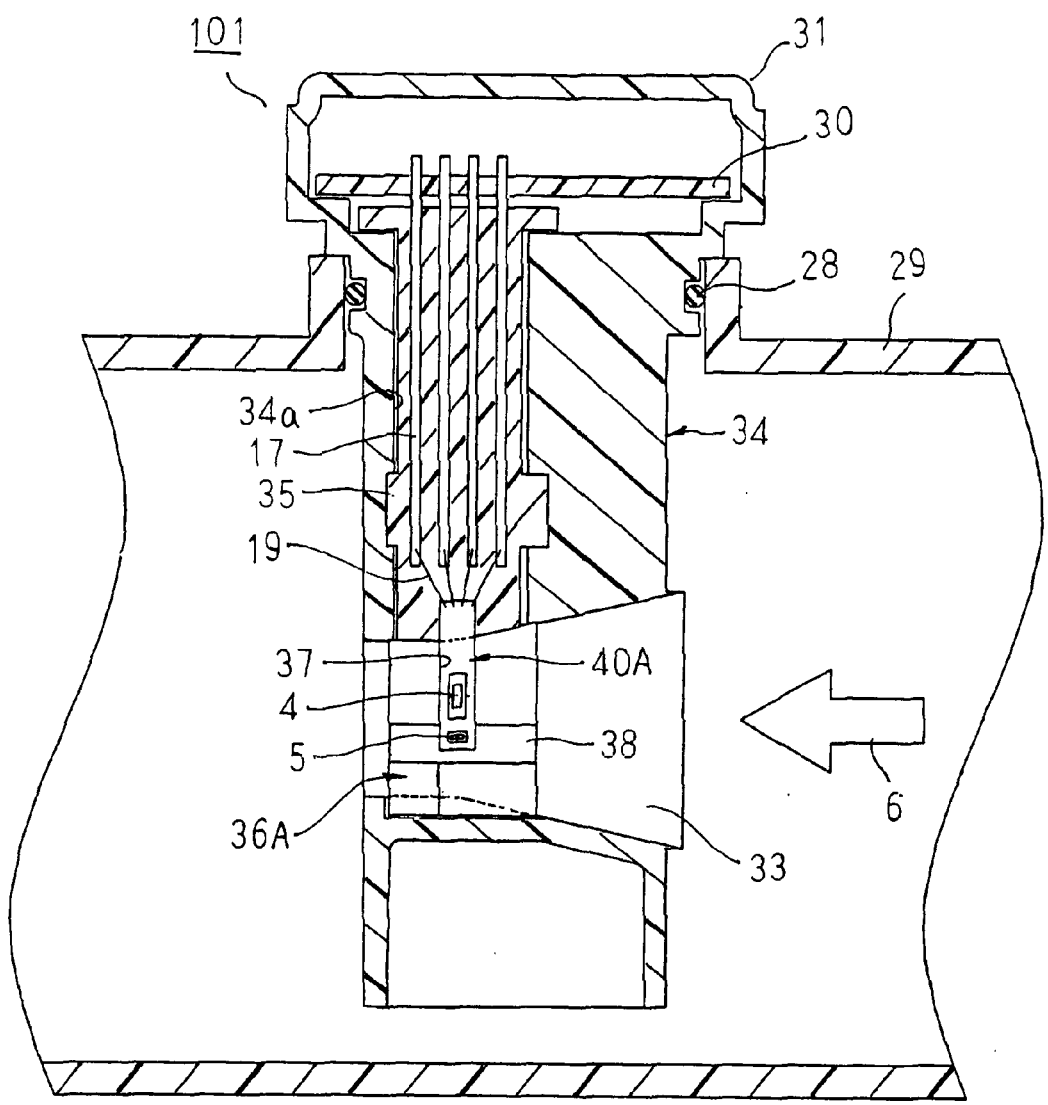
FIG. 7 is a longitudinal section showing the thermosensitive flow rate sensor according to Embodiment 2 of the present invention.
Figure 8:
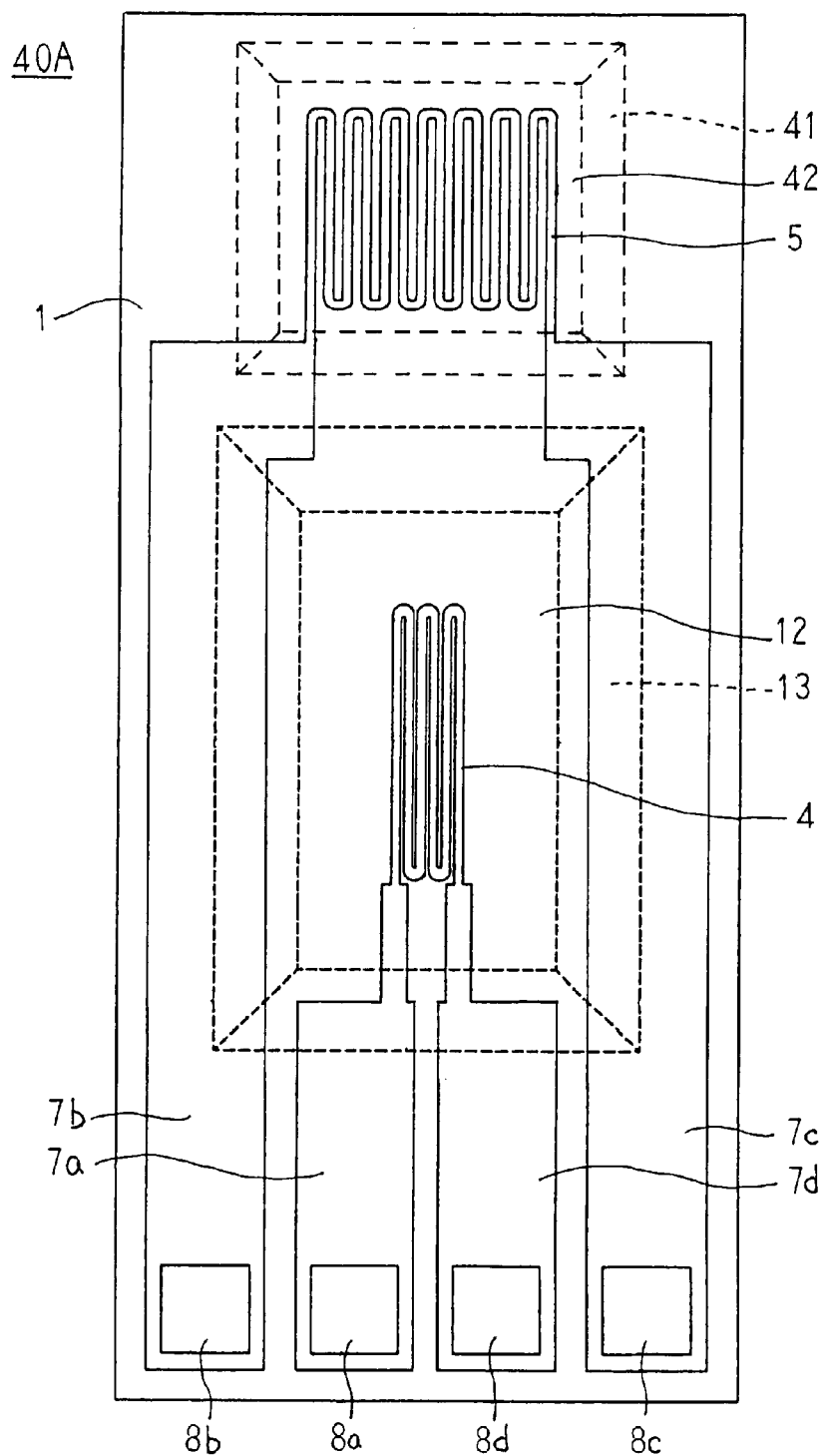
FIG. 8 is a plan showing a detecting element used in the thermosensitive flow rate sensor according to Embodiment 2 of the present invention.

FIGS. 6 and 7 are a front elevation and a longitudinal section, respectively, showing a thermosensitive flow rate sensor according to Embodiment 2 of the present invention, and FIG. 8 is a plan showing a detecting element used in the thermosensitive flow rate sensor according to Embodiment 2 of the present invention.

In a detecting element 40A used in a thermosensitive flow rate sensor 101 according to Embodiment 2, as shown in FIG. 8, the heating element 4 is disposed on the flow rate detection diaphragm 12 which is formed in a central portion of the flat substrate 1, and the fluid temperature detector 5 is disposed on the fluid temperature detection diaphragm 42 which is formed in a tip portion of the flat substrate 1. The groove 38 parallel to the central axis of the detector passage 33 is disposed so as to extend from a downstream end to an upstream end on a tip side of a support 36A, and the recess portion 37 is formed so as to extend from the root end of the support 36A to the groove 38.

Moreover, the detecting element 40A is constructed in a similar manner to the detecting element 40 according to Embodiment 1 except for the fact that the positions where the heating element 4 and the fluid temperature detector 5 are formed are different. The support 36A is constructed in a similar manner to the support 36 according to Embodiment 1 except for the fact that the positions where the recess portion 37 and the groove 38 are formed are different.

The support 36A is mounted to the base member 35 so as to extend into the detector passage 33, and is disposed so as to pass through a central axis of the detector passage 33 (in a direction perpendicular to the surface of the page in FIG. 6 and aligned with the direction of flow 6 of the fluid being measured) and to divide a passage cross section of the detector passage 33 perpendicular to the central axis into two sections. The detecting element 40A is disposed inside the recess portion 37 such that a surface of the detecting element 40A is positioned generally in a common plane with the major surface of the support 36A. Here, a tip portion of the detecting element 40A is positioned above the groove 38. In other words, the tip portion of the detecting element 40A is not supported by the support 36A, but forms a cantilever configuration. The fluid temperature detection diaphragm 42 is also positioned above the groove 38.

Moreover, the rest of this embodiment is constructed in a similar manner to Embodiment 1 above.

In Embodiment 2, because the groove 38 is formed in the support 36A so as to pass along the lower side of the fluid temperature detector 5, in a similar manner to Embodiment 1 above, the temperature detected by the fluid temperature detector 5 swiftly tracks the temperature changes of the fluid being measured, and the temperature of the heating element 4 can be controlled at the value higher by the predetermined temperature than the temperature of the fluid being measured even if the temperature of the fluid being measured changes.

Because the region where the fluid temperature detector 5 is formed constitutes the fluid temperature detection diaphragm 42, the heat capacity of the region where the fluid temperature detector 5 is formed is reduced, and the fluid temperature detector 5 is thermally insulated from the neighboring flat substrate 1.

Because the groove 38 is formed in the support 36A so as to extend from an upstream end to a downstream end, the fluid being measured can be supplied to the rear surface side of the fluid temperature detector 5 without interruption and in large quantity, enabling the actual temperature of the fluid being measured to be detected swiftly by the fluid temperature detector 5 even if the temperature of the fluid being measured changes.

Because the support 36A is disposed so as to divide the passage cross section of the detector passage 33 into two sections, the flow velocity distribution is made uniform even if there are drift currents in the flow of the fluid being measured, improving the precision of the flow rate detection.

Because the tip surface of the support 36A (the lower end surface in FIG. 6) is not exposed inside the detector passage 33, the fluid being measured is directed to the heating element 5 without disturbances arising in the flow, providing a stable detected flow rate signal with few disturbances.

In addition, because the detecting element 40A is supported by the support 36A so as to form a cantilever configuration with the tip end which includes the region where the fluid temperature detector 5 is formed positioned above the groove 38, a space is formed between the support 36A and the vicinity of the fluid temperature detector 5, significantly reducing the influence of the heat capacity of the support 36A on temperature detection by the fluid temperature detector 5. Thus, the detected flow rate signal can be obtained swiftly and accurately even if the temperature of the fluid being measured changes.

Moreover, in each of the above embodiments, the groove 38 is formed so as to extend from the upstream end to the downstream end of the support 36 (36A), but the groove 38 does not necessarily have to be formed over the entire length of the support 36 (36A) in the direction of flow of the fluid being measured; the groove may also be disposed so as to pass along under the fluid temperature detection diaphragm 42, and open upstream and downstream from the fluid temperature detection diaphragm 42 in the direction of flow of the fluid being measured, for example. In that case, the fluid being measured flows in through the groove opening upstream from the fluid temperature detection diaphragm 42, is directed under the fluid temperature detection diaphragm 42, acclimatizes the fluid temperature detection diaphragm 42 to the temperature of the fluid being measured by forced convective heat transfer, and then flows out through the groove opening downstream from the fluid temperature detection diaphragm 42.

Even if the downstream end of the groove 38 in the direction of flow of the fluid being measured is not formed so as to extend to the downstream end of the support 36 (36A), because the fluid being measured is directed inside the groove smoothly as long as the upstream end of the groove 38 in the direction of flow of the fluid being measured is formed so as to extend to the upstream end of the support 36 (36A), outflow of the fluid being measured through the groove opening downstream from the fluid temperature detection diaphragm 42 is promoted, preventing stagnation of the fluid being measured in the groove. Hence, even if the temperature of the fluid being measured flowing through the inside of the major passage 29 changes, the temperature of the fluid being measured flowing through the inside of the groove changes without delay.

Even if the upstream end of the groove 38 in the direction of flow of the fluid being measured is not formed so as to extend to the upstream end of the support 36 (36A), because the fluid being measured flows out from the groove smoothly as long as the downstream end of the groove 38 in the direction of flow of the fluid being measured is formed so as to extend to the downstream end of the support 36 (36A), inflow of the fluid being measured into the groove opening upstream from the fluid temperature detection diaphragm 42 is promoted, preventing stagnation of the fluid being measured in the groove. Hence, even if the temperature of the fluid being measured flowing through the inside of the major passage 29 changes, the temperature of the fluid being measured flowing through the inside of the groove changes without delay.

The present invention uses the groove 38 to direct the fluid being measured under the region where the fluid temperature detector 5 is formed, and swiftly acclimatizes the region where the fluid temperature detector 5 is formed to the temperature of the fluid being measured by forced convective heat transfer. Consequently, in each of the above embodiments, the support 36 (36A) is disposed such that the angle θ between the major surface of the support 36 (36A) and the central axis of the detector passage 33 is seven degrees, but the angle θ is not limited to seven degrees provided that the fluid being measured flows through the inside of the groove 38. For example, if the angle θ is 45 degrees, damage to the diaphragm resulting from fluid pressure from the fluid being measured and drifts in the detected flow rate resulting from dust accumulation in the region where the heating element is formed can be significantly suppressed compared to when the angle 0 is 90 degrees (when the major surface of the support is perpendicular to the flow of the fluid being measured). Moreover, in a flow rate sensor in which extension of the life of the diaphragm and increased detection precision are desired, it is desirable that 0 degrees≦0≦30 degrees.

In each of the above embodiments, the fluid temperature detector 5 is formed on the fluid temperature detection diaphragm 42, but, depending on the intended use of the thermosensitive flow rate sensor, the fluid temperature detection diaphragm 42 need not be formed if the construction is such that the fluid being measured can also be circulated by the groove 38 to the rear surface side of the region where the fluid temperature detector 5 is formed. In other words, when there is no fluid temperature detection diaphragm 42, the heat capacity of the flat substrate 1 has the effect of reducing the temperature detection tracking by the fluid temperature detector 5 relative to the temperature changes in the fluid being measured, but the reduction in temperature detection tracking is suppressed by the fluid being measured flowing through the groove 38 onto the rear surface side of the region where the fluid temperature detector 5 is formed.

In addition, in each of the above embodiments, thermosensitive flow rate sensors were explained in which one heating element 4 is formed on the flow rate detection diaphragm 12 and the flow rate of the fluid being measured is detected by means of the excitation current flowing to the heating element 4, but other types are acceptable provided that the thermosensitive flow rate sensor is of a diaphragm type in which the flow rate or the flow velocity are measured by heat transfer to the fluid being measured. For example, types in which temperature detecting resistors are disposed upstream and downstream from the heating element and the temperature difference between the temperature detecting resistors is detected are also acceptable, and types in which a plurality of heating elements are disposed upstream and downstream and the differences between the excitation currents flowing to each of the heating elements are detected are also acceptable.

The present invention is constructed in the above manner and exhibits the effects described below.

According to one aspect of the present invention, there is provided a thermosensitive flow rate sensor including:
  a detecting element having:
    a flat substrate;
    a heating element and a fluid temperature detector each made of a thermosensitive resistor film and formed so as to be separated from each other on a surface of the flat substrate; and
    a flow rate detection diaphragm formed by partially removing the flat substrate from a rear surface side under a region where the heating element is formed; and
  a support having a recess portion for housing the detecting element formed on a surface thereof, the support being disposed such that the surface is inclined at a predetermined angle relative to a direction of flow of a fluid being measured,
  wherein the detecting element is housed inside the recess portion and supported by the support such that a surface of the detecting element is positioned generally in a common plane with the surface of the support and such that a direction of alignment of the heating element and the fluid temperature detector is perpendicular to the direction of flow of the fluid being measured, and
  a groove having a groove direction lying in the direction of flow of the fluid being measured is formed in the support so as to pass under a region where the fluid temperature detector of the detecting element is formed. Hence, a thermosensitive flow rate sensor is provided which enables flow rate to be measured accurately without adversely affecting a detected flow rate signal even if the temperature of the fluid being measured changes because the fluid being measured is directed under the region where the fluid temperature detector is formed and the region where the fluid temperature detector is formed is swiftly acclimatized to the temperature of the fluid being measured by forced convective heat transfer.

The fluid temperature detector may be formed at a first end side of the flat substrate, and the detecting element may be supported in a cantilever configuration by the support such that a first end portion of the detecting element including the region where the fluid temperature detector is formed extends into the groove, making the temperature of the fluid being measured detected by the fluid temperature detector less likely to be subjected to the influence of the heat capacity of the support, thereby improving tracking of the detected temperature of the fluid being measured to temperature changes in the fluid being measured.

The groove may extend to an upstream end portion of the support in the direction of flow of the fluid being measured, whereby the fluid being measured is directed under the region where the fluid temperature detector is formed smoothly and in large quantity, thereby improving tracking of the detected temperature of the fluid being measured to temperature changes in the fluid being measured.

The groove may extend to a downstream end portion of the support in the direction of flow of the fluid being measured, whereby the fluid being measured is directed under the region where the fluid temperature detector is formed smoothly and in large quantity, thereby improving tracking of the detected temperature of the fluid being measured to temperature changes in the fluid being measured.

A fluid temperature detection diaphragm may be formed by partially removing the flat substrate from a rear surface side under a region where the fluid temperature detector is formed, reducing the heat capacity of the region where the fluid temperature detector is formed and thermally insulating the fluid temperature detector from the neighboring flat substrate, thereby improving tracking of the detected temperature of the fluid being measured to temperature changes in the fluid being measured.

A pipe-shaped detector passage may be provided for the fluid being measured to flow through, the support being disposed inside the detector passage so as to divide into two sections a passage cross section of the detector passage perpendicular to the direction of flow of the fluid being measured, making the flow velocity distribution of the fluid being measured flowing through the inside of the detector passage uniform, thereby improving the precision of the flow rate detection. In addition, because the end surface of the support in a direction perpendicular to the direction of flow of the fluid being measured is not exposed, the fluid being measured can be directed to the heating element without being disturbed, thereby providing a stable detected flow rate signal.

What is claimed is:

1. A thermosensitive flow rate sensor comprising:

a detecting element comprising:

a flat substrate;

a heating element and a fluid temperature detector each made of a thermosensitive resistor film and formed so as to be separated from each other on a surface of said flat substrate; and a flow rate detection diaphragm formed by partially removing said flat substrate from a rear surface side under a region where said heating element is formed; and a support having a recess portion for housing said detecting element formed on a surface thereof, said support being disposed such that the surface is inclined at a predetermined angle relative to a direction of flow of a fluid being measured, wherein said detecting element is housed inside said recess portion and supported by said support such that a surface of said detecting element is positioned generally in a common plane with the surface of said support and such that a direction of alignment of said heating element and said fluid temperature detector is perpendicular to the direction of flow of said fluid being measured, and a groove having a groove direction lying in the direction of flow of said fluid being measured is formed in said support so as to pass under a region where said fluid temperature detector of said detecting element is formed.

2. The thermosensitive flow rate sensor according to claim 1, further comprising a fluid temperature detection diaphragm formed by partially removing said flat substrate from a rear surface side under a region where said fluid temperature detector is formed.

3. The thermosensitive flow rate sensor according to claim 1, further comprising a pipe-shaped detector passage provided for said fluid being measured to flow through, wherein said support is disposed inside said detector passage so as to divide into two sections a passage cross section of said detector passage perpendicular to the direction of flow of said fluid being measured.

4. A thermosensitive flow rate sensor according to claim 3, wherein a first end side of said flat substrate is not exposed inside the detector passage.

5. The thermosensitive flow rate sensor according to claim 1 wherein said groove extends to a downstream end portion of said support in the direction of flow of said fluid being measured.

6. The thermosensitive flow rate sensor according to claim 1 wherein said groove extends to an upstream end portion of said support in the direction of flow of said fluid being measured.

7. The thermosensitive flow rate sensor according to claim 6 wherein said groove extends to a downstream end portion of said support in the direction of flow of said fluid being measured.

8. The thermosensitive flow rate sensor according to claim 1 wherein said fluid temperature detector is formed at a first end side of said flat substrate, and said detecting element is supported in a cantilever configuration by said support such that a first end portion of said detecting element including said region where said fluid temperature detector is formed extends into said groove.

9. The thermosensitive flow rate sensor according to claim 8 wherein said groove extends to a downstream end portion of said support in the direction of flow of said fluid being measured.

10. The thermosensitive flow rate sensor according to claim 8 wherein said groove extends to an upstream end portion of said support in the direction of flow of said fluid being measured.

11. The thermosensitive flow rate sensor according to claim 10 wherein said groove extends to a downstream end portion of said support in the direction of flow of said fluid being measured.

12. A thermosensitive flow rate sensor according to claim 1, further comprising:

a circuit case wherein said circuit case houses said flat substrate;

a connector, wherein said connector supplies electric power to said thermosensitive flow rate sensor; and an insertion member, wherein said insertion member extends to a first side from said circuit case.

13. A thermosensitive flow rate sensor according to claim 12, wherein said circuit, said connector and said insertion member are integrally formed.

* * * * *